US008027589B2

United States Patent
Song et al.

(10) Patent No.: US 8,027,589 B2
(45) Date of Patent: Sep. 27, 2011

(54) ALL-OPTICAL FREQUENCY UPCONVERTER AND ALL-OPTICAL FREQUENCY UPCONVERSION METHOD IN RADIO-OVER-FIBER SYSTEM

(75) Inventors: Jong-In Song, Gwangju (KR); Hyoung-Jun Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 762 days.

(21) Appl. No.: 12/050,871

(22) Filed: Mar. 18, 2008

(65) Prior Publication Data

US 2008/0298813 A1     Dec. 4, 2008

(30) Foreign Application Priority Data

May 29, 2007    (KR) ........................ 10-2007-0051822

(51) Int. Cl.
*H04B 10/00* (2006.01)
*H04B 10/04* (2006.01)
(52) U.S. Cl. ....................................... 398/115; 398/183
(58) Field of Classification Search .................. 398/115, 398/116, 37, 182, 183, 202–204, 208, 211
See application file for complete search history.

(56) References Cited

U.S. PATENT DOCUMENTS

| 5,400,164 | A | * | 3/1995 | Kurtzke et al. | ............... | 398/150 |
| 5,861,970 | A | * | 1/1999 | Tatham et al. | ............... | 398/150 |
| 2004/0234273 | A1 | * | 11/2004 | Sayyah et al. | ............... | 398/149 |

OTHER PUBLICATIONS

Michael J. Connelly, "*Semiconductor Optical Amplifiers*", Kluwer Academic Publishers, Jan. 2002.
G. H. Smith et al., "*A Millimeter-Wave Full Duplex Fiber-Radio Star-Tree Architecture Incorporating WDM and SCM*", IEEE Photonics Technology Letters, p. 1650-1652, vol. 10, No. 11, Nov. 1998.
Rongqing Hui et al., "*Subcarrier Multiplexing for High-Speed Optical Transmission*", Journal of Lightwave Technology, p. 417-427, vol. 20, No. 3, Mar. 2002.
A. Loayssa et al., "*Optical Single-Sideband Modulator for Broad-Band Subcarrier Multiplexing Systems*", IEEE Photonics Technology Letters, p. 311-313, vol. 15, No. 2, Feb. 2003.

(Continued)

*Primary Examiner* — Dalzid Singh

(57) ABSTRACT

Disclosed is an all-optical frequency upconverter in a radio-over-fiber system that outputs upconverted optical radio frequency (RF) signals using an optical intermediate frequency signal and an optical local oscillation signal. The all-optical frequency upconverter includes a semiconductor optical amplifier that mixes the optical intermediate frequency signal with the optical local oscillation signal through four wave mixing, and an optical filter that filters a plurality of frequency component signals, which are generated through the four wave mixing, to extract optical RF signals. According to the invention the system configuration can be made simple, and wide LO and IF frequency bandwidths can be provided.

6 Claims, 8 Drawing Sheets

OTHER PUBLICATIONS

Guido Hunziker et al., "*Polarization-Independent Wavelength Con*
Y.-K. Seo et al., "*All-Optical Signal Up-Conversion for Radio-on-Fiber Applications Using Cross-Gain Modulation in Semiconductor Optical Amplifiers*", IEEE Photonics Technology Letters, p. 1448-1450, vol. 14, No. 10, Oct. 2002.
Ho-Jin Song et al., "*Signal Up-Conversion by Using a Cross-Phase-Modulation in All-Optical SOA-MZI Wavelength Converter*", IEEE Photonics Technology Letters, p. 593-595, vol. 16, No. 2, Feb. 2004.
A. D'Ottavi et al., "*Efficiency and Noise Performance of Wavelength Converters Based on FWM in Semiconductor Optical Amplifiers*", IEEE Photonics Technology Letters, p. 357-359, vol. 7, No. 4, Apr. 1995. version at 2.5 Gb/s by Dual-Pump Four-Wave Mixing in a Strained Semiconductor Optical Amplifier", IEEE Photonics Technology Letters, p. 1633-1635, vol. 8, No. 12, Dec. 1996.
Guido Giuliani et al., "*Noise Analysis of Conventional and Gain-Clamped Semiconductor Optical Amplifiers*", Journal of Lightware Technology, p. 1256-1263, vol. 18, No. 9, Sep. 2000.
A. D'Ottavi et al., "*Very high efficiency four-wave mixing in a single semiconductor traveling-wave amplifier*", American Institute of Physics, 1996.
Chiming Wu et al., "*Small signal analysis of frequency response of four-wave mixing in semiconductor optical amplifiers*", Journal of Applied Physics, p. 2076-2078, vol. 87, No. 5, Mar. 2000.

* cited by examiner

[FIG. 1]
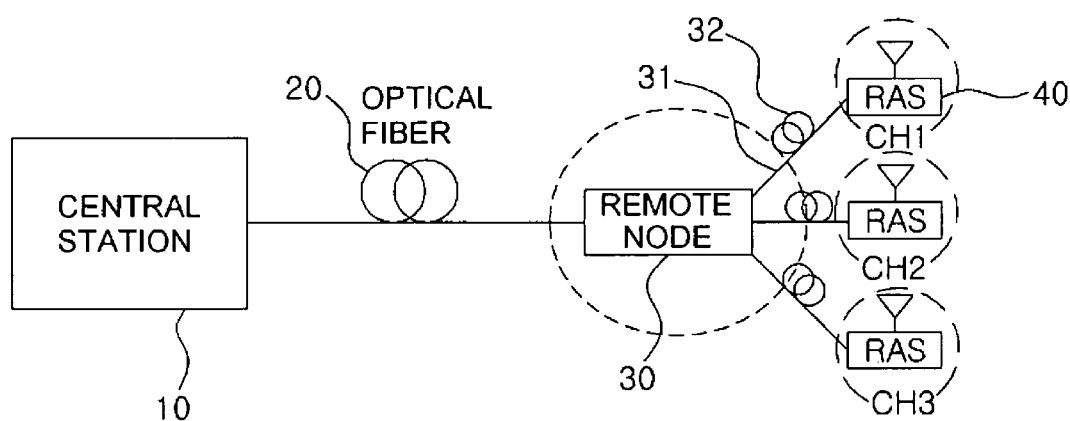
[FIG. 2]
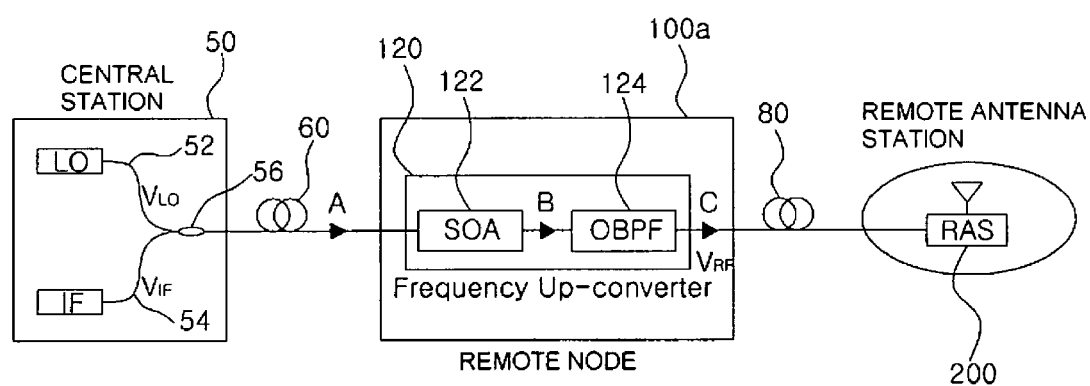

[FIG. 6]
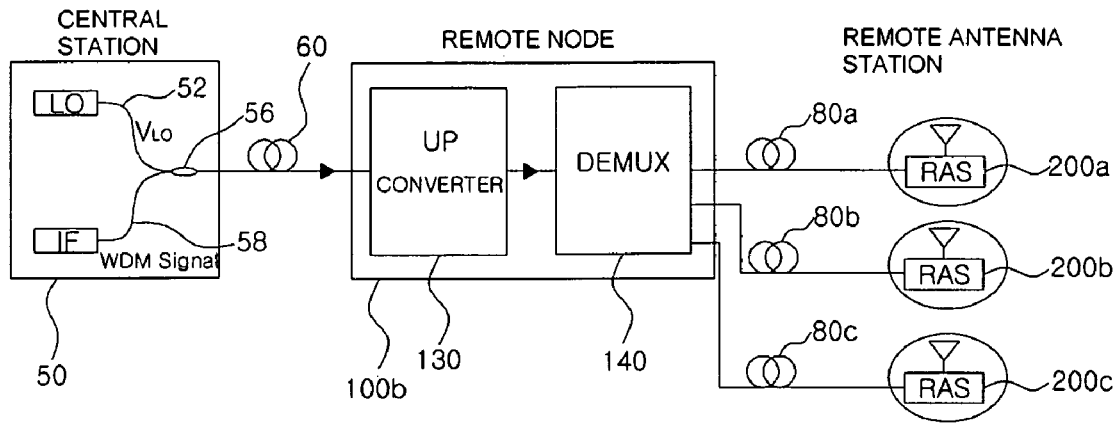
[FIG. 7]
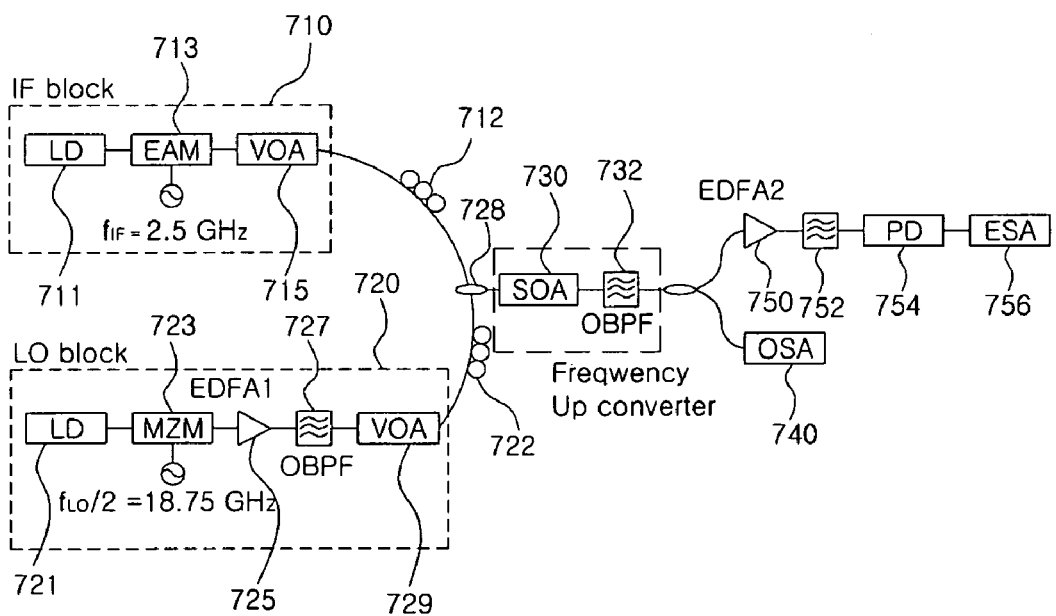

ific Field

The present invention relates to an all-optical frequency upconversion method and an all-optical frequency upconverter in a radio-over-fiber system, and in particular, to all-optical frequency upconversion method and an all-optical frequency upconverter in a radio-over-fiber system that mix an optical IF (Intermediate Frequency) signal with an optical LO (Local Oscillation) signal to generate an optical RF (Radio Frequency) signal.

2. Background Art

Recently, in the fields of wireless communications, studies for improving speed and quality of broadband multimedia traffic are actively in progress. In a broadband multimedia service, for massive data transmission, the frequency of a radio signal is being increased up to the microwave or millimeter-wave band. As the frequency is increased, an electric transmission line, generally used for transmission of high-frequency electrical signals, experiences a high transmission loss. A radio-over-fiber (RoF) technology has been proposed so as to solve the problem arising from the high transmission loss of the electrical transmission line. According to the RoF technology, an optical RF signal containing a microwave or millimeter-wave radio signal is transmitted through an optical fiber, which has features including ultra-wide broadband and low transmission loss.

The RoF system has attracted much attention in the broadband wireless access fields, such as wireless backbone network, remote medical service, and multimedia broadcasting. With the RoF technology, a cost-effective broadband convergence network incorporating a high-speed optical communication network and a wireless communication network can be constructed.

FIG. 1 is a conceptual diagram showing a general RoF system.

Referring to FIG. 1, the RoF system includes a central station 10, a remote node 30, and a remote antenna station (RAS) 40.

Data (carried on an IF signal) from the high-speed backbone network is modulated by a modulator at the remote node 30 using an LO signal to produce an optical RF signal 31. The optical RF signal 31 is then transmitted to the RAS 40 through an optical fiber 32, which has features including ultra-wide broadband and low transmission loss. The RAS 40 converts the optical RF signal 31 into a radio signal and sends the converted radio signal through an antenna.

Methods for converting data into the optical RF signal 31 include one that uses an electro-optic modulator and the other that uses all-optical frequency converter.

The all-optical frequency conversion method is suitable for an ultra-wide broadband RoF system because the wavelength division multiplexing (WDM) system, which is capable of markedly improving the frequency utilization, can be used. The WDM system is a technology that multiplexes multiple channels on a single optical fiber by using different wavelengths. That is, the channels are allocated to different wavelengths spaced at an equal wavelength interval, then the signals are correspondingly carried on the channels, and subsequently the channels are optically multiplexed. Accordingly, different signals are transmitted through a single optical fiber.

The all-optical frequency conversion system reported previously uses XGM (Cross-Gain Modulation) or XPM (Cross-Phase Modulation) effect inherent in a semiconductor optical amplifier (SOA). The all-optical frequency conversion system employing the XGM or XPM effect of the SOA is advantageously applied to the WDM system due to its wide LO frequency bandwidth characteristics. However, it has a limited IF frequency bandwidth (usually limited to several GHz or less) arising from the carrier lifetime of the SOA.

The limited IF frequency bandwidth characteristics of the all-optical frequency conversion system employing the XGM or XPM effect of the SOA adversely affects application of the sub-carrier multiplexing (SCM) system, which is also capable of markedly increasing the data transmission capacity, to the RoF system, together with the WDM system.

Accordingly, for implementation of the millimeter-wave ultra-wide broadband RoF, there is a need for a novel all-optical frequency conversion system that is capable of simultaneously applying the WDM system and the SCM system, and has wide LO and IF frequency bandwidths.

There are reports on all-optical frequency conversion system that use four wave mixing (FWM) effect by a HNL-DSF (High-nonlinear dispersion shifted fiber) and a Raman pump ("Seamless Integration of an 8×2.5 Gb/s WDM-PON and Radio-Over-Fiber Using All-Optical Up-Conversion Based on Raman-Assisted FWM", *IEEE Photon. Technol. Lett.*, vol. 17, pp. 1986-1988, September 2005, Jianjun Yu, Jinxing Gu, Xiang Liu, Zhensheng Jia, and Gee-Kung Chang). These all-optical frequency conversion systems utilizing the FWM have wider IF frequency bandwidth than the all-optical frequency conversion system utilizing the XGM or XPM effect of the SOA, and thus the WDM system and the SCM system can be simultaneously applied to increase the bandwidth of the RoF system. However, in the known all-optical frequency conversion system, which uses the FWM effect by the HNL-DSF and the Raman pump, a no-gain optical fiber is used to use the FWM effect. For this reason, the HNL-DSF and the Raman pump having good nonlinearity are used to increase the conversion efficiency in the no-gain optical fiber. As a result, the length of the optical fiber to be used reaches approximately 1 km, and the Raman pump needs to be provided, which causes the complexity of the overall system configuration.

SUMMARY OF THE INVENTION

It is, therefore, a primary object of the invention to provide an all-optical frequency upconversion method using four wave mixing effect in a radio-over-fiber system, having an advantage of being implemented with simple configuration.

It is another object of the invention to provide an all-optical frequency upconverter using four wave mixing effect in a radio-over-fiber system, having an advantage of being implemented with simple configuration.

According to an aspect of the invention, there is provided an all-optical frequency upconversion method in a radio-over-fiber system, which uses a semiconductor optical amplifier and an optical filter. The all-optical frequency upconversion method includes: causing the semiconductor optical amplifier to mix an optical intermediate frequency signal with an optical local oscillation signal through four wave mixing; and filtering a plurality of frequency component signals, which are generated through the four wave mixing, by the optical filter to extract optical radio frequency (RF) signals. The all-optical frequency upconversion method may further include causing the semiconductor optical amplifier to receive the optical intermediate frequency signal and the optical local oscillation signal from a central station through a first optical fiber. The all-optical frequency upconversion method may further include transmitting the optical RF signals to a remote antenna station through a second optical fiber. The all-optical frequency upconversion method may further include photoelectrically converting the optical RF signals transmitted through the second optical fiber by a photodetector in the remote antenna station to generate upconverted RF signals. The optical intermediate frequency signal may be modulated at a first electrical frequency to have a first optical frequency, the optical local oscillation signal may be modulated at a second electrical frequency to have a second optical frequency, and the RF signals may have an electrical frequency that corresponds to the sum of the second electrical frequency and the first electrical frequency and an electrical frequency that corresponds to a difference between the second electrical frequency and the first electrical frequency. The optical intermediate frequency signal may be a wavelength division multiplexing (WDM) signal.

According to another aspect of the invention, there is provided an all-optical frequency upconversion method in an all-optical frequency upconverter of a radio-over-fiber system. The all-optical frequency upconversion method includes: mixing an optical intermediate frequency signal with an optical local oscillation signal through four wave mixing; and filtering a plurality of frequency component signals, which are generated through the four wave mixing, to extract optical RF signals.

According to still another aspect of the invention, there is provided an all-optical frequency upconverter in a radio-over-fiber system that outputs upconverted optical RF signals using an optical intermediate frequency signal and an optical local oscillation signal. The all-optical frequency upconverter includes: a semiconductor optical amplifier that mixes the optical intermediate frequency signal with the optical local oscillation signal through four wave mixing; and an optical filter that filters a plurality of frequency component signals, which are generated through the four wave mixing, to extract optical RF signals.

BRIEF DESCRIPTION OF THE DRAWINGS

FIG. 1 is a conceptual view showing a general radio-over-fiber (RoF) system;

FIG. 2 is a conceptual view showing a radio-over-fiber system, in which an all-optical frequency upconversion system using four wave mixing effect according to an embodiment of the invention is used;

FIG. 6 is a conceptual view showing an RoF system, in which all-optical frequency upconversion system according to an embodiment of the invention is applied to different wavelength division multiplexing (WDM) signals;

FIG. 7 is a diagram showing a system for testing an all-optical frequency upconversion system using four wave mixing effect according to an embodiment of the invention;

DESCRIPTION OF PREFERRED EMBODIMENTS

Figure 3:
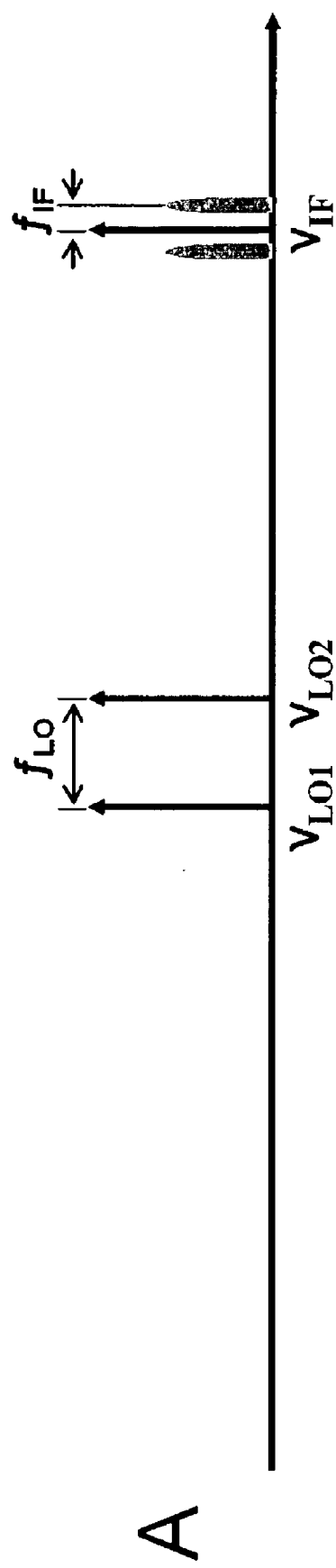
FIGS. 3 to 5 are graphs showing an optical spectrum of signals at points A, B, and C shown in FIG. 2, respectively.

The invention may be changed in various ways and have various embodiments. In the following description, specific embodiments will be illustrated and described in detail.

However, it should be understood that the embodiments are not intended to limit the invention, and various changes, equivalents, and alternatives are resorted without departing from the spirit of the invention and fall within the technical scope of the invention.

The terms "first", "second", and the like are used to explain, not intended to limit, various components. These terms are only used to distinguish one component from other components. For example, "first component" may be named as "second component", or vice versa, without departing from the scope of the invention. As used herein, the term "and/or" includes any and all combinations of one or more of the associated listed items.

Preferred embodiments of the invention will now be described in detail with reference to the accompanying drawings. In the drawings, the same parts are represented by the same reference numerals, and the overlap descriptions thereof will be omitted.

Hereinafter, an all-optical frequency upconversion system using four wave mixing (FWM) effect of a semiconductor optical amplifier (SOA) will be described.

Figure 4:
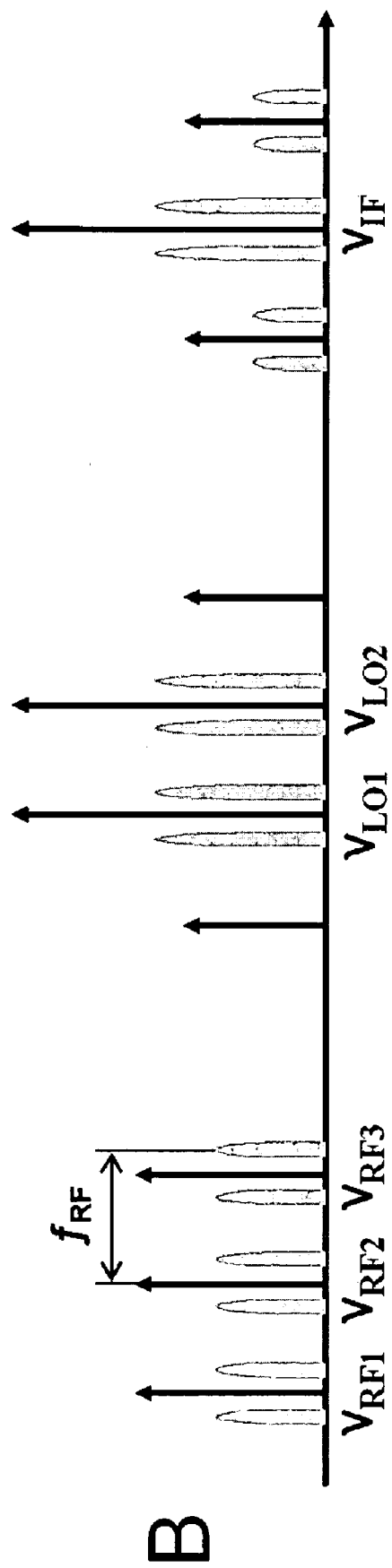
Figure 5:
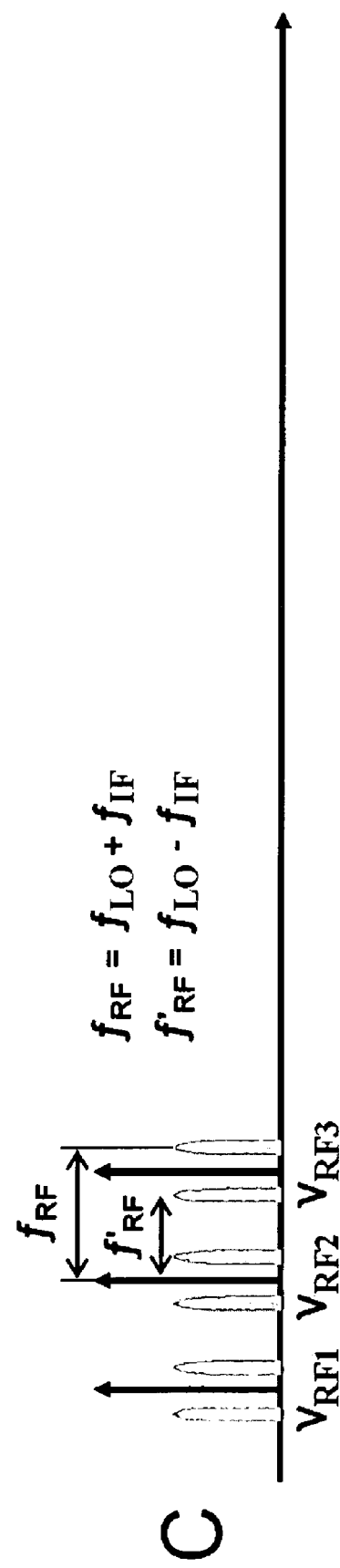

FIG. 2 is a conceptual view showing a radio-over-fiber (RoF) system, in which an all-optical frequency upconversion system using the FWM effect according to an embodiment of the invention is used. FIGS. 3 to 5 are graphs showing an optical spectrum of signals at points A, B, and C shown in FIG. 2, respectively.

Referring to FIG. 2, the RoF system includes a central station 50, a remote node 100a, and a remote antenna station (RAS) 200. The remote node 100a includes a frequency upconverter 120. Here, for example, a semiconductor optical amplifier (SOA) 122 and an optical band-pass filter (OBPF) 124 may be provided in the remote node 100a, which is spaced at a predetermined distance from the central station 50. Alternatively, a semiconductor optical amplifier (SOA) 122 and an optical band-pass filter (OBPF) 124 may be provided in the central station 50.

The central station 50 modulates a laser signal having an optical frequency $v_{IF}$ ($v_{IF}=c/\lambda_{IF}$, where c denotes the speed of light and $\lambda_{IF}$ denotes the wavelength of light) by an electrical frequency $f_{IF}$ to generate an optical IF signal $v_{IF}$ 54, and also modulates a laser signal having an optical frequency $v_{LO}$ ($v_{LO}=c/\lambda_{LO}$, where c denotes the speed of light and $\lambda_{LO}$ denotes the wavelength of light) by an electrical frequency $f_{LO}$ to generate an optical LO signal $v_{LO}$ 52.

The optical IF signal $v_{IF}$ 54 and the optical LO signal $v_{LO}$ 52 are coupled by a photocoupler 56 and input to the frequency upconverter 120 in the remote node 100a through a single optical fiber 60.

The frequency upconverter 120 includes the semiconductor optical amplifier (SOA) 122 and the optical band-pass filter (OBPF) 124. The frequency upconverter 120 performs frequency upconversion of the input optical IF signal $v_{IF}$ 54 and optical LO signal $v_{LO}$ 52 and outputs upconverted optical RF signals $v_{RF1}$, $v_{RF2}$, and $v_{RF3}$. At the input (point A) of the semiconductor optical amplifier 122, the spectrum of the optical signal is shown in FIG. 3.

The optical IF signal $v_{IF}$ 54 and the optical LO signal $v_{LO}$ 52 input to the semiconductor optical amplifier 122 are amplified by the semiconductor optical amplifier 122 and mixed through the FWM effect, such that an output signal having different frequency components is generated.

At the output (point B) of the semiconductor optical amplifier 122, the spectrum of the optical signal is shown in FIG. 4.

The FWM effect in the semiconductor optical amplifier 122 is in association with third-order nonlinear susceptibility of polarization effect.

The polarization effect may be represented by Expression 1. When the field intensity of an input signal is small, as represented by Expression 1, the polarization effect may be divided into a linear part and a nonlinear part, and may be expanded in a power series.

$$\overline{P}(t) = \overline{P}_L(t) + \overline{P}_{NL(t)}$$
$$= \overline{P}^{(1)}(t) + \overline{P}^{(2)}(t) + \overline{P}^{(3)}(t) + \ldots$$
$$= \chi^{(1)}\overline{E}(t) + \chi^{(2)}\overline{E}(t)^{(2)} + \chi^{(3)}\overline{E}(t)^3 + \ldots$$

[Expression 1]

Here, P(t) denotes a polarization component vector, $P_L(t)$ denotes a linear polarization component vector, and $P_{NL}(t)$ denotes a nonlinear polarization component vector. In addition, $P^{(1)}(t)$ denotes a first-order polarization component, $P^{(2)}(t)$ denotes a second-order polarization component, and $P^{(3)}(t)$ denotes a third-order polarization component. Furthermore, $\chi^{(1)}$ denotes first-order susceptibility, $\chi^{(2)}$ denotes second-order susceptibility, and $\chi^{(3)}$ denotes third-order susceptibility. E(t) denotes a field intensity vector of an input signal.

In the FWM, the input signal may be composed of a plurality of optical signals having different optical frequencies. For example, for Expression 2, three optical signals having different optical frequencies are used as the input signal when the FWM is applied.

$$\overline{E}(t) = E_{LO1}e^{-i2\pi v_{LO1}t} + E_{LO2}e^{-i2\pi v_{LO2}t} + E_{IF}e^{-i2\pi v_{IF}t} + C.C$$ [Expression 2]

Here, E(t) denotes the field intensity vector of the input signal, $E_{LO1}$ denotes the field intensity vector of the input optical LO signal ($v_{LO1}$), $E_{LO2}$ denotes the field intensity vector of the input optical LO signal ($v_{LO2}$), and $E_{IF}$ denotes the field intensity vector of the input optical IF signal ($v_{IF}$). In addition, c.c denotes the complex conjugate component of each of the field component of the input optical LO signal ($v_{LO1}$), the field component of the input optical LO signal ($v_{LO2}$), and the field component of the input optical IF signal ($v_{IF}$).

If Expression 2 is assigned to Expression 1, the third-order polarization component may be represented by Expression 3.

$$\hat{P}^{(3)}(t) = \chi^{(3)}\overline{E}(t)^3$$

[Expression 3]

$$= \chi^{(3)}\Big[ E_{LO1}^3 e^{-6\pi i(v_{LO1})t} + E_{LO2}^3 e^{-6\pi i(v_{LO2})t} +$$
$$E_{IF}^3 e^{-6\pi i(v_{IF})t} +$$
$$6E_{LO1}E_{LO2}E_{IF}^* e^{-2\pi i(v_{LO1}+v_{LO2}-v_{IF})t} +$$
$$3E_{LO1}^2 E_{IF}^* e^{-2\pi i(2v_{LO1}-v_{IF})t} +$$
$$3E_{LO2}^2 E_{IF}^* e^{-2\pi i(2v_{LO2}-v_{IF})t} + \ldots \Big]$$

(where * denotes a complex conjugate number) Among various frequency components at the output of the semiconductor optical amplifier through the FWM, the optical RF signals $v_{RF1}$, $v_{RF2}$, and $v_{RF3}$ may be used for all-optical frequency upconversion. Each of the optical RF signals $v_{RF1}$, $v_{RF2}$, and $v_{RF3}$ has an optical frequency represented by Expression 4.

$$v_{RF1} = 2 \times v_{LO1} - v_{IF}$$
$$v_{RF2} = v_{LO1} + v_{LO2} - v_{IF}$$
$$v_{RF3} = 2 \times v_{LO2} - v_{IF}$$ [Expression 4]

Here, $v_{RF1}$, $v_{RF2}$, and $v_{RF3}$ denote the optical frequencies of the individual optical RF signals $v_{RF1}$, $v_{RF2}$, and $v_{RF3}$, $v_{LO1}$. In addition, $v_{LO2}$ denotes the optical frequency of each of the optical LO signals $v_{LO1}$ and $v_{LO2}$, and $v_{IF}$ denotes the optical frequency of the optical IF signal $v_{IF}$.

Returning to Expression 3, it can be seen that, in the FWM effect, the optical frequencies $v_{RF1}$, $v_{RF2}$, and $v_{RF3}$ of the optical RF signals $v_{RF1}$, $v_{RF2}$, and $v_{RF3}$ represented by Expression 4 are in association with the third-order susceptibility of the polarization effect represented by Expression 3.

The optical band-pass filter (OBPF) 124 filters the output signal of the semiconductor optical amplifier 122 at the point B shown in FIG. 2 to extract desired upconverted optical RF signals $v_{RF1}$, $v_{RF2}$, and $v_{RF3}$. The optical spectrum at the output (point C) of the optical band-pass filter 124 is shown in FIG. 5. In FIG. 5, the electrical frequency $f_{RF}$ corresponds to $f_{LO+IF}$, and the electrical frequency $f_{RF}$ corresponds to $f_{LO-IF}$. The optical RF signals $v_{RF1}$, $v_{RF2}$, and $v_{RF3}$, which are filtered by the optical band-pass filter 124, are transmitted to the remote antenna station 200 through an optical fiber 80. Then, the optical RF signals $v_{RF1}$, $v_{RF2}$, and $v_{RF3}$, are photoelectrically converted into upconverted RF signals with electrical frequencies $f_{LO-IF}$ and $f_{LO+IF}$ shown in FIG. 5 by a photodetector (PD) (not shown).

FIG. 6 is a conceptual view showing an RoF system, in which an all-optical frequency upconversion system according to an embodiment of the invention is applied to different wavelength division multiplexing (WDM) signals. Hereinafter, an RoF system having three channels will be described with reference to FIG. 6.

In FIG. 6, a plurality of WDM signals 58 having different wavelengths are input to a frequency upconverter 130, together with an optical LO signal 52.

Referring to FIG. 6, the RoF system includes a central station 50, a remote node 100b, and a plurality of remote antenna stations 200a, 200b, and 200c. Here, for example, the frequency upconverter 130 and a demultiplexer 140 may be provided in the remote node 100b, which is spaced at a predetermined distance from the central station 50. Alternatively, the frequency upconverter 130 and the demultiplexer 140 may be provided in the central station 50.

The central station 50 generates an optical IF signal 58 containing a plurality of WDM signals having different wavelengths, and modulates a laser signal having an optical frequency $v_{LO}$ ($v_{LO} = c/\lambda_{LO}$, where c denotes the speed of light and $\lambda_{LO}$ denotes the wavelength of light) by an electrical frequency $f_{LO}$ to generate an optical LO signal $v_{LO}$ 52.

The optical IF signal 58 and the optical LO signal $v_{LO}$ 52 are coupled by a photocoupler 56 and input to the frequency upconverter 130 in the remote node 100b through a single optical fiber 60.

As shown in FIG. 2, the frequency upconverter 130 may include the semiconductor optical amplifier (SOA) 122 and the optical band-pass filter (OBPF) 124. The frequency upconverter 130 mixes the input optical IF signal 58 and optical LO signal 52 through the FWM effect by the semiconductor optical amplifier 122 to generate an output signal having different frequency components, and then filters the output signal to output upconverted optical RF signals.

The demultiplexer 140 demultiplexes the output signal of the frequency upconverter 130 and outputs the demultiplexed signals. The output signals of the demultiplexer 140 are correspondingly transmitted to the remote antenna stations 200a, 200b, and 200c through optical fibers 80a, 80b, and 80c, and photoelectrically converted into RF signals by the photodetectors (PD) (not shown) in the remote antenna stations 200a, 200b, and 200c, respectively. Then, the RF signals are sent through antennas of the remote antenna stations 200a, 200b, and 200c, respectively.

FIG. 7 is a diagram showing a system for testing an all-optical frequency upconversion system using four wave mixing effect according to an embodiment of the invention.

Referring to FIG. 7, first, in an LO block 720, for DSB-SC (Double SideBand-Suppressed Optical Carrier) modulation, LO signals are generated using a Mach-Zehnder modulator (MZM) 723, which is biased at $v_\pi$, and a laser diode 721. Then, two LO signals with a difference 37.5 GHz are obtained using an electrical signal source of 18.75 GHz. The suppressed carrier ratio of each of the optical LO signals is 15 dB. To increase optical LO power and remove amplified spontaneous emission (ASE) noise, an erbium-doped fiber amplifier 1 (EDFA1) 725 and an optical band-pass filter (OBPF) 727 are used.

An IF block 710 generates the optical IF signal using a laser diode 711, an electrical signal source of 2.5 GHz, and an electro-absorption modulator (EAM) 713. Variable optical attenuators (VOA) 715 and 729 are correspondingly provided at the output terminals of the LO block 720 and the IF block 710 to control power of the optical input signals. In addition, polarization controllers (PC) (not shown) are correspondingly provided at the output terminals of the LO block 720 and the IF block 710 to control the polarization states of the optical input signals. The optical LO signals and the optical IF signal are coupled by a photocoupler 728 and input to the frequency upconverter, which includes a semiconductor optical amplifier (SOA) 730 and an optical band-pass filter (OBPF) 732. In this experiment, as the semiconductor optical amplifier (SOA) 730, SOA-NL-OEC-1550 (manufactured by CIP (Centre for Integrated Photonics)), which is a kind of nonlinear SOA, was used. The center wavelengths of each of the optical LO signals and the optical IF signal are 1546.12 mm and 1549.32 mm, respectively. In this experiment, the SOA 730 was biased at 360 mA.

An EDFA2 750 is provided in front of a photodetector 754, for example, a photo diode, so as to measure an electrical spectrum and a phase noise characteristic. The output of the EDFA2 750 passes through an optical band-pass filter 752 and the photodetector 754 and is input to an electrical spectrum analyzer 756. In addition, the output of the optical band-pass filter 732 is input to an optical spectrum analyzer 740.

Figure 8:
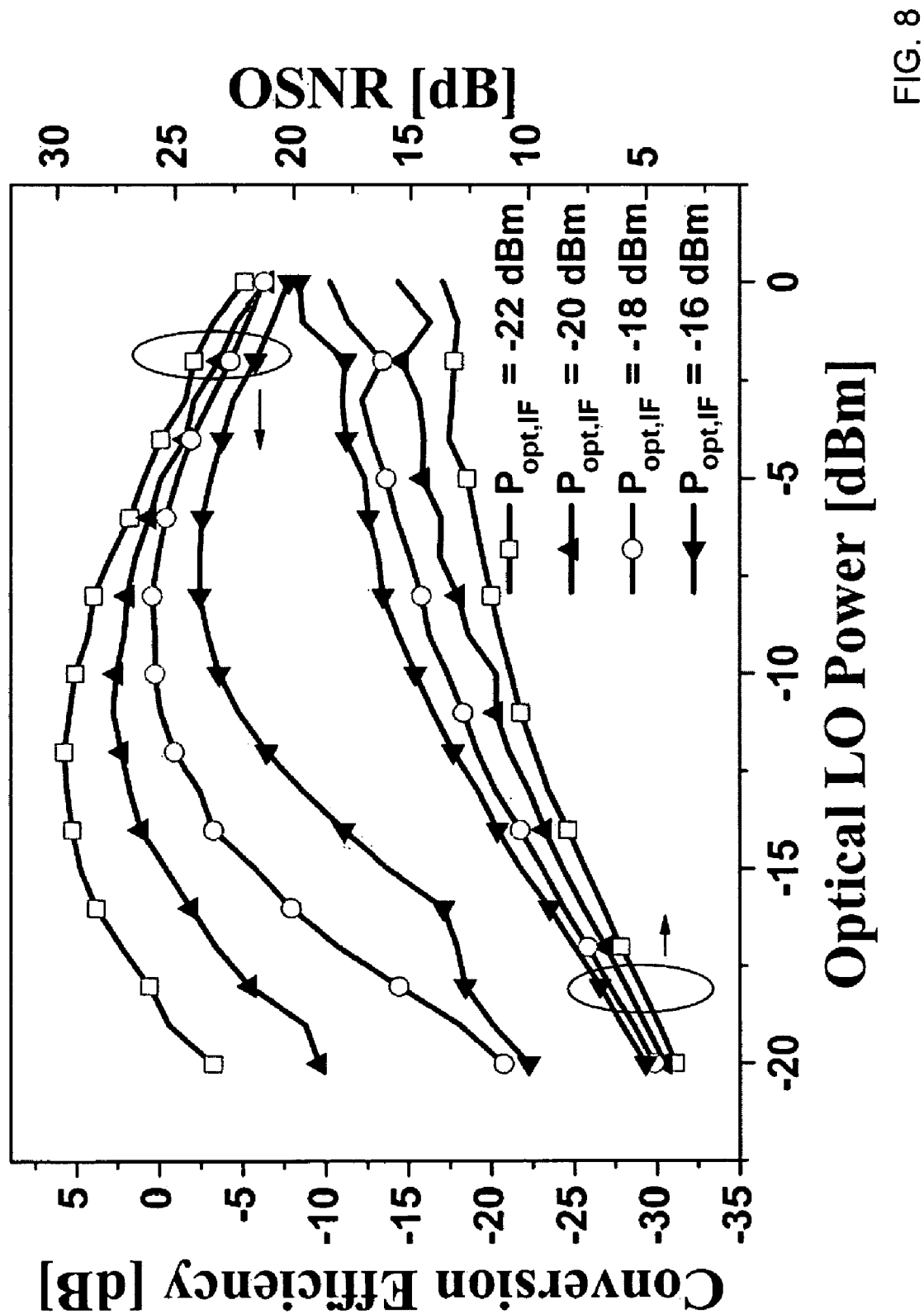
FIG. 8 is a diagram showing conversion efficiency based on optical power of an optical LO signal and an optical IF signal and an optical signal-to-noise ratio (OSNR) characteristic in an all-optical frequency upconverter including a semiconductor optical amplifier and an optical band-pass filter shown in FIG. 7.

FIG. 8 is a diagram showing conversion efficiency based on optical power of the optical LO signal and the optical IF signal and an optical signal-to-noise ratio (OSNR) characteristic in the all-optical frequency upconverter including the semiconductor optical amplifier 730 and the optical band-pass filter 732 shown in FIG. 7.

The conversion efficiency is defined by a ratio $P_{E,RF}/P_{E,IF}$ of electrical power of the upconverted RF signal and electrical power of the IF signal, which is measured in front of the semiconductor optical amplifier (SOA) before frequency upconversion, and is measured by dB. The OSNR is defined by a ratio of peak power of the optical RF signal and ASE noise power of the semiconductor optical amplifier.

As shown in FIG. 8, the conversion efficiency and the OSNR vary depending on optical power of the optical LO signal and the optical IF signal. Specifically, in case of the low-power optical LO signal, it can be seen that the conversion efficiency comparatively significantly varies depending on optical IF power. In the high-power optical LO signal, it can be seen that the conversion efficiency does not comparatively significantly vary depending on optical IF power during the FWM because power of the optical LO signal is much larger than that of the optical IF signal. That is, it can be seen that the conversion efficiency decreases as power of the optical IF signal or power of the optical LO signal increase. In addition, it can be seen that, since the semiconductor optical amplifier (SOA) 730 has an optical gain, the conversion efficiency becomes larger than 1 (one). Meanwhile, as power of the optical LO signal increases, ASE noise power decreases, and then the OSNR increases. For the optimum performance of the RoF system, appropriate optical power of the optical LO signal and the optical IF signal is required.

Figure 9:
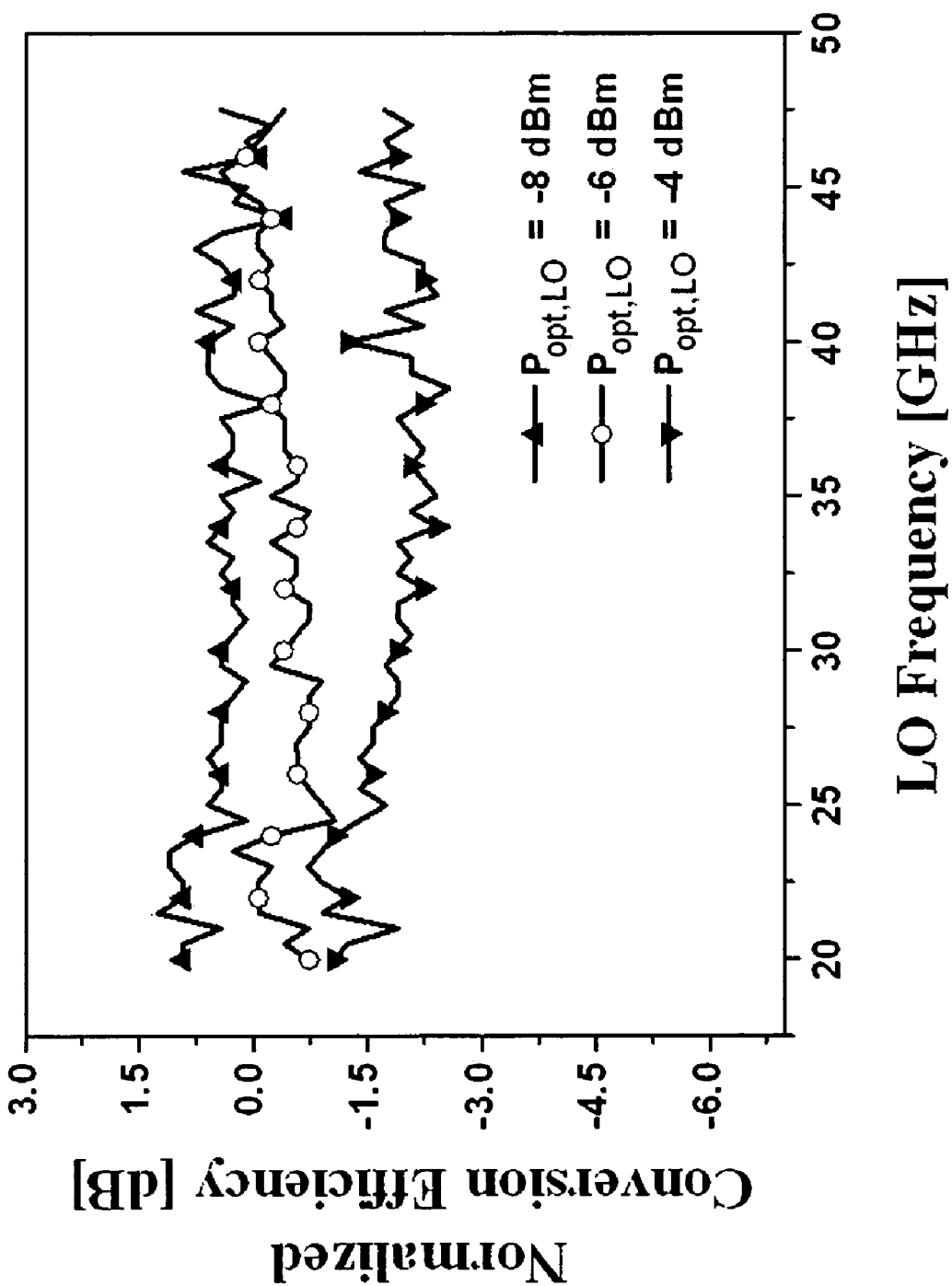
FIG. 9 is a diagram showing conversion efficiency at an LO frequency in an all-optical frequency upconverter shown in FIG. 7.

FIG. 9 is a diagram showing conversion efficiency at an LO frequency in the all-optical frequency upconverter shown in FIG. 7. Referring to FIG. 9, it can be seen that the conversion efficiency is substantially uniform at an LO frequency band from 20 GHz to 47.5 GHz.

Figure 10:
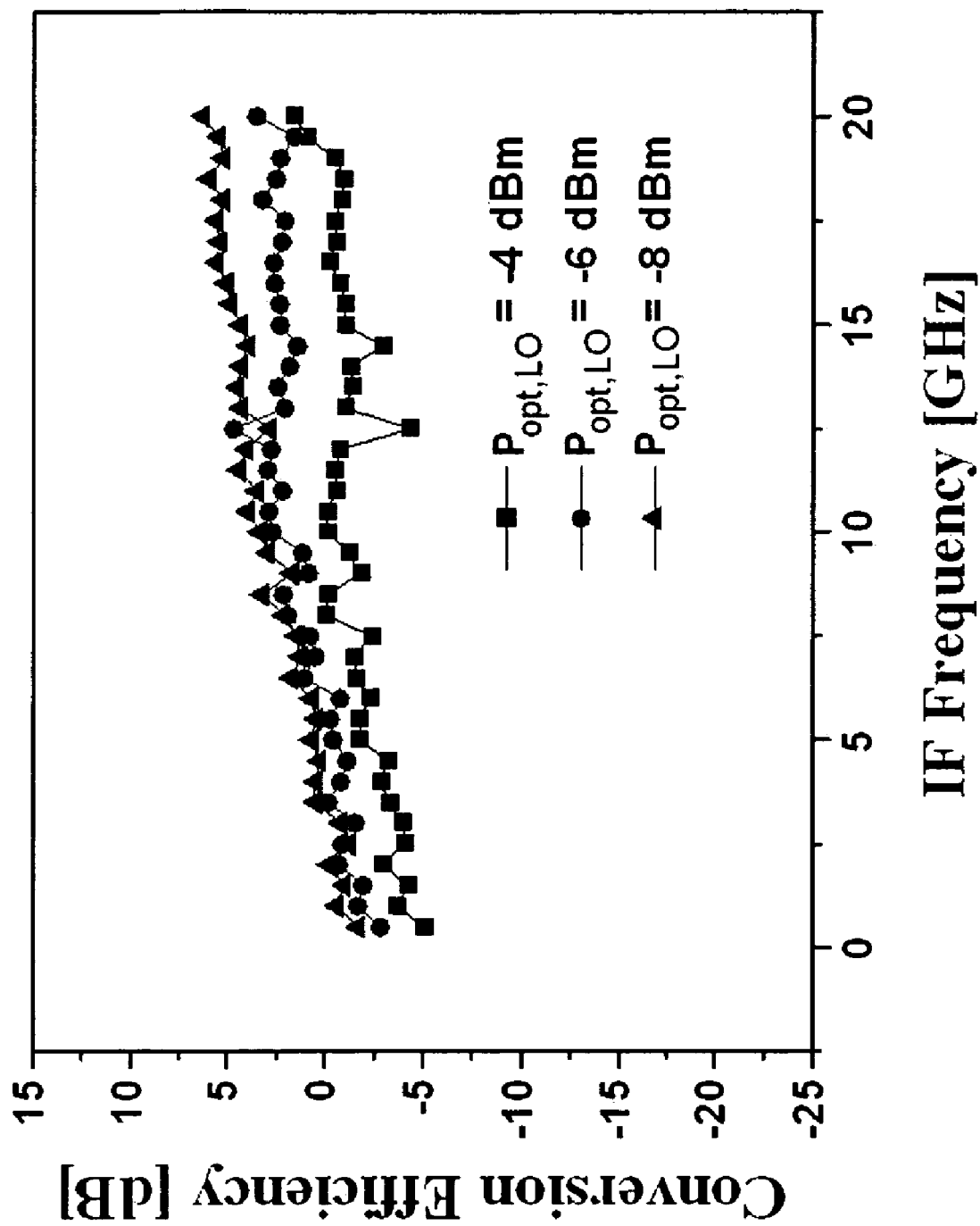
FIG. 10 is a diagram showing conversion efficiency at an IF frequency in an all-optical frequency upconverter shown in FIG. 7.

FIG. 10 is a diagram showing conversion efficiency at an IF frequency in the all-optical frequency upconverter shown in FIG. 7. Referring to FIG. 10, it can be seen that the conversion efficiency is comparatively uniform at an IF frequency band from 0 GHz to 20 GHz.

The conversion efficiencies at the LO frequency and the IF frequency shown in FIGS. 9 and 10 are obtained by measurement, and the frequency bandwidths are limited by the frequency bandwidth of the measurement instrument.

Theoretically, however, the LO frequency bandwidth and the IF frequency bandwidth of the all-optical frequency upconverter using the FWM effect of the semiconductor optical amplifier (SOA) are significantly larger than the measurement values.

The FWM effect refers to the effect that two or more input optical signals modulate the gain and refractive index of the semiconductor optical amplifier (SOA) by a beat frequency between the input signals, thereby generating new optical signals.

As the mechanism for the FWM, there are known CDM (Carrier Density Modulation), SHB (Spectral Hole Burning), and CH (Carrier Heating). Among these, SHB and CH refer to the intraband effect in the single band, and the characteristic time is significantly short, for example, approximately hundreds fs. The characteristic time corresponds to the frequency bandwidth of hundreds GHz.

Accordingly, the all-optical frequency upconversion technology using the FWM effect according to the invention can provide the LO and IF frequency bandwidths of hundreds GHz.

Therefore, it can be suitably used in implementing an ultra-wide broadband RoF system, to which the WDM system and the SCM system are applied.

According to the all-optical frequency upconversion method and the all-optical frequency upconverter using the FWM effect in the RoF system, instead of the no-gain optical fiber, the semiconductor optical amplifier (SOA) as an active element is provided so as to use the FWM effect. Therefore, the system configuration can be made simple, and the wide LO and IF frequency bandwidths can be provided.

In addition, since the semiconductor optical amplifier (SOA) as an active element, instead of the known optical fiber, is used, conversion efficiency having a positive gain can be provided. For this reason, it is not necessary to provide a frequency mixer as an ultra-high frequency electronic element.

Furthermore, since the wide LO and IF frequency bandwidths can be provided, the performance and efficiency of a WDM and SCM-based ultra-wide broadband RoF system, in which the wide LO and IF frequency bandwidths are needed in the millimeter-wave band, can be markedly improved. As a result, it is practically used to construct a cost-effective and competitive wired/wireless integrated system.

Although the present invention has been described in connection with the exemplary embodiments of the present invention, it will be apparent to those skilled in the art that various modifications and changes may be made thereto without departing from the scope and spirit of the invention.

What is claimed is:

1. An all-optical frequency upconversion method to generate a single optical radio frequency (RF) signal in a radio-over-fiber system, which uses a semiconductor optical amplifier and an optical filter, the all-optical frequency upconversion method comprising:
   mixing an optical intermediate frequency signal with an optical local oscillation signal utilizing a four wave mixing effect in the semiconductor optical amplifier;
   filtering the optical RF signal from number of frequency component signals generated through the four wave mixing effect in the semiconductor optical amplifier by using the optical filter to extract the optical RF signal;
   transmitting the optical RF signal to a remote antenna station through a first optical fiber; and
   converting the optical RF signal transmitted through the first optical fiber using a photodetector in the remote antenna station to generate electrical RF signals,
   wherein a laser signal having an optical frequency of $v_{IF}$ is modulated by an electrical frequency of $f_{IF}$ to generate the optical intermediate frequency signal, and a laser signal having an optical frequency of $v_{LO}$ is modulated by an electrical frequency of $f_{LO}$ to generate the optical local oscillation signal, and
   wherein the electrical RF signals have electrical frequencies of $f_{LO}+f_{IF}$ and $f_{LO}-f_{IF}$.

2. The all-optical frequency upconversion method of claim 1, further comprising:
   feeding the optical intermediate frequency signal and the optical local oscillation signal from a central station to an input of the semiconductor optical amplifier through a second optical fiber.

3. A wavelength division multiplexing (WDM) all-optical frequency upconversion method to generate WDM optical RF signals in a WDM radio-over-fiber system, the all-optical frequency upconversion method comprising:
   mixing WDM optical intermediate frequency signals with an optical local oscillation signal utilizing a four wave mixing efect;
   filtering the WDM optical RF signals from a number of frequency component signals generated through the four wave mixing effect to extract optical RF signals;
   demultiplexing the WDM optical RF signals using an optical demultiplexer;
   transmitting the demultiplexed RF signals to remote antenna stations through a first optical fiber; and
   converting the demultiplexed RF signals transmitted through the first optical fiber using photodetectors in the remote antenna stations to generate electrical RF signals,
   wherein laser signals having optical frequencies of $v_{IF}$ (n is the channel number) are modulated by an electrical frequency of $f_{IF}$ to generate the WDM optical intermediate frequency signals and a laser signal having an optical frequency of $v_{LO}$ is modulated by an electrical frequency of $f_{LO}$ to generate the optical local oscillation signal, and
   wherein the electrical RF signals have electrical frequencies of $f_{LO}+f_{IF}$ and $f_{LO}-f_{IF}$.

4. The WDM all-optical frequency upconversion method of claim 3,
   wherein the mixing of the WDM optical intermediate frequency signals with the optical local oscillation signal through four wave mixing is performed in a semiconductor optical amplifier.

5. An all-optical frequency upconverter in a radio-over-fiber system that outputs upconverted optical RF signals through mixing WDM optical intermediate frequency signals and an optical local oscillation signal, the all-optical frequency upconverter comprising:
   a semiconductor optical amplifier configured to mix the WDM optical intermediate frequency signals with the optical local oscillation signal utilizing a four wave mixing efect; and
   an optical demultiplexer configured to filter and demultiplex a number of frequency component signals generated through the four wave mixing effect to extract WDM optical RF signals,
   wherein the optical RF signals are transmitted to remote antenna stations through a first optical fiber,
   wherein the optical RF signals transmitted through the first optical fiber are converted using photodetectors in the remote antenna stations to generate electrical RF signals,
   wherein laser signals having optical frequencies of $v_{IFn}$ (n is the channel number) are modulated by an electrical frequency of $f_{IF}$ to generate the WDM optical intermediate frequency signals and a laser signal having an optical frequency of $v_{LO}$ is modulated by an electrical frequency of $f_{LO}$ to generate the optical local oscillation signal, and
   wherein the electrical RF signals have electrical frequencies of $f_{LO}+f_{IF}$ and $f_{LO}-f_{IF}$.

6. The all-optical frequency upconverter of claim 5,
   wherein the semiconductor optical amplifier receives the optical intermediate frequency signal and the optical local oscillation signal from a central station through a second optical fiber.

* * * * *